United States Patent [19]

Krogdahl

[11] Patent Number: 4,586,465
[45] Date of Patent: May 6, 1986

[54] INTERNAL COMBUSTION ENGINE

[76] Inventor: Michael R. Krogdahl, 79 Primrose St., Belgian Gardens, Townsville, Queensland, 4810, Australia

[21] Appl. No.: 689,983

[22] Filed: Jan. 9, 1985

Related U.S. Application Data

[63] Continuation of Ser. No. 451,055, Dec. 20, 1982, abandoned.

[30] Foreign Application Priority Data

Feb. 4, 1982 [AU] Australia ............................ 80208/82

[51] Int. Cl.[4] ......................... F02B 33/14; F02B 19/04
[52] U.S. Cl. ............................. 123/59 BS; 123/193 P; 123/48 C
[58] Field of Search ............... 123/193 R, 193 P, 661, 123/657, 276, 65 S, 59 BS, 48 C

[56] References Cited

U.S. PATENT DOCUMENTS

| | | | |
|---|---|---|---|
| 1,673,182 | 6/1928 | Burtnett | 123/59 BS |
| 3,489,130 | 1/1970 | Polidan et al. | 123/48 C |
| 4,070,999 | 1/1978 | Matsuno | 123/59 BS |
| 4,324,214 | 4/1982 | Garcea | 123/193 P |

FOREIGN PATENT DOCUMENTS 54-42506 4/1979 Japan ............................ 123/193 P Primary Examiner—Craig R. Feinberg
Attorney, Agent, or Firm—Sand & Hudak Co.

[57] ABSTRACT

An internal combustion engine has a cylinder with a porting ring adjacent the cylinder head to reduce the diameter of the cylinder. The piston in the cylinder has a reduced diameter crown portion complementary to the porting ring and an upper face on the crown provided with a small clearance from the cylinder head to provide a large squish area. A primary combustion chamber of "dogbone" shape is provided in the crown, while a secondary combustion chamber is provided under the crown. On the power stroke, the sparking plug ignites the air/fuel mixture in the primary combustion chamber and the pressure pulse generated pushes the piston down the cylinder. When the piston crown clears the porting ring, the air/fuel mixture in the secondary combustion chamber is ignited and a second pressure pulse is applied to the piston. The slower, staged, burning of the air/fuel mixture in the cylinder applies a more powerful driving force to the piston, generating increased torque.

7 Claims, 6 Drawing Figures

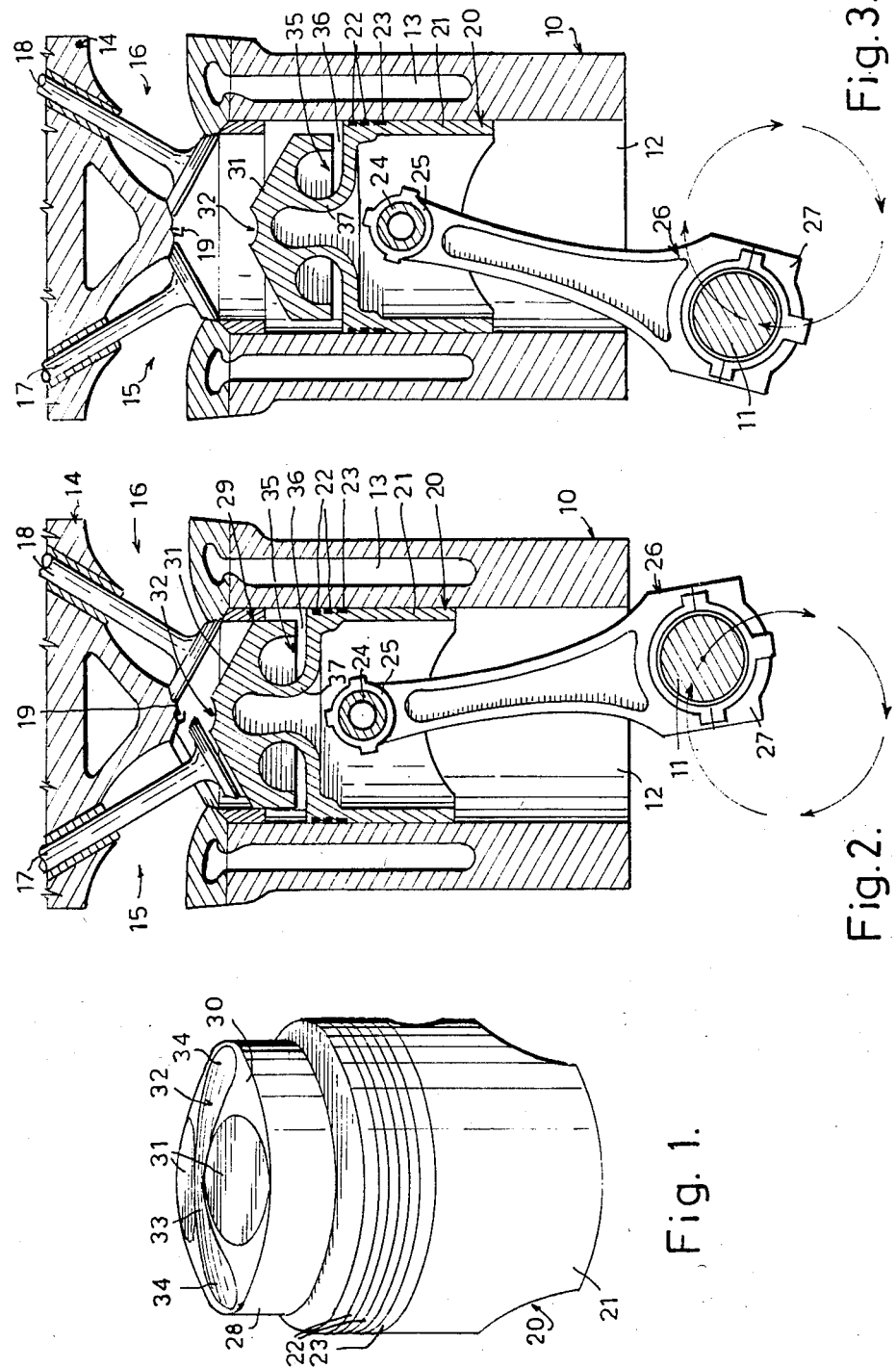

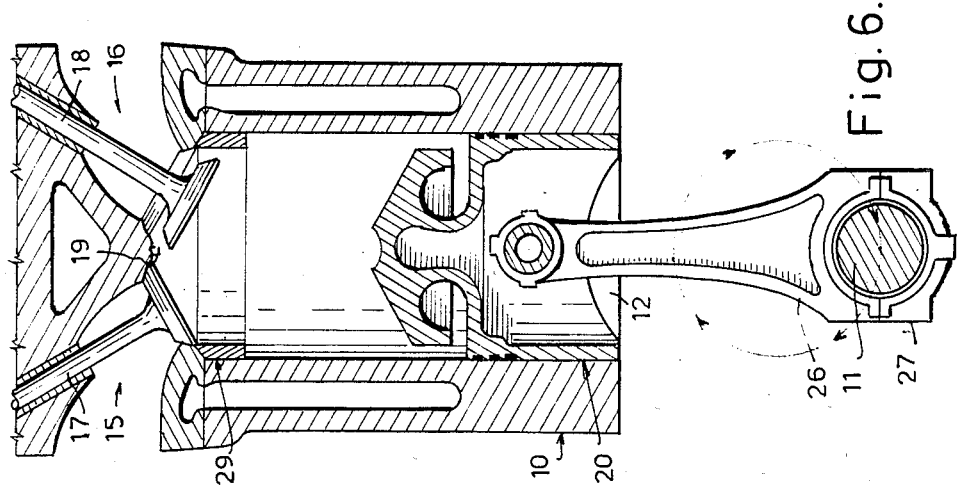
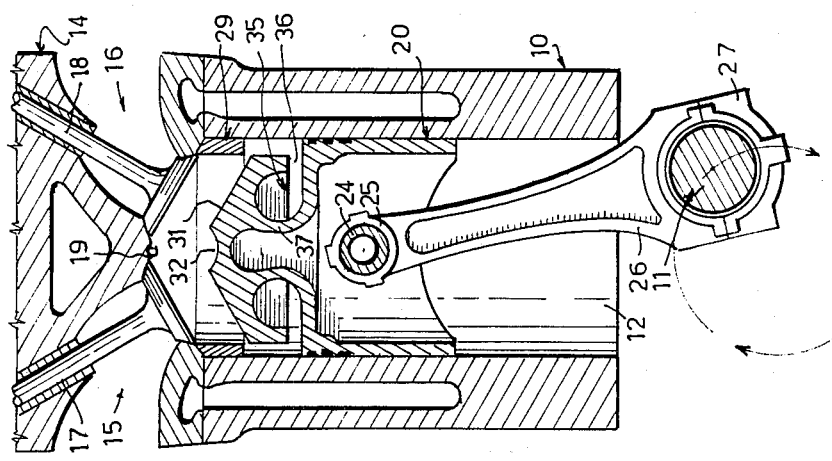
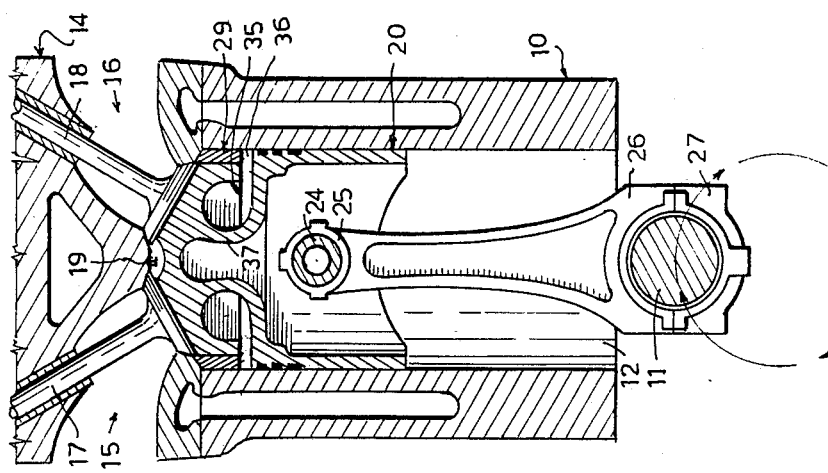

INTERNAL COMBUSTION ENGINE

CROSS-REFERENCE

This is a continuation application of application Ser. No. 451,055 filed Dec. 20, 1982 now abandoned.

BACKGROUND OF THE INVENTION (1) Field of the Invention

This invention relates to improvements in internal combustion engines and, in particular, to the design of the combustion chambers in such engines.

(2) Brief Description of the Prior Art

The modern engine designer has to consider and balance a number of divergent factors when designing a new engine. Environmental controls require that the engine be as pollution-free as possible and, in certain countries, be capable of operating on unleaded fuel. With the high cost of gasoline, the engine must be fuel efficient, both for its capacity and its power output. Finally, the engine must have acceptable performance characteristics e.g. it must be free-revving and/or have a wide, flat torque band at low RPM's.

Many innovative designs have been proposed using such items as fuel injection, turbo-charging, catalytic converters and "knock" sensors. While the performance of these engines has been satisfactory, the engines are complex and expensive to build and maintain.

BRIEF SUMMARY OF THE INVENTION

It is an ojbect of the present invention to provide an engine design which overcomes or obviates the problems faced by engine designers.

It is a preferred object to provide a design which can be applied to both new and existing engines.

It is a further preferred object to provide a design which produces good volumetric efficiency without valve overlap or turbo-charging (or supercharging).

It is a still further preferred object to provide an engine where the air/fuel mixture has a slow, progressive burn period.

Other preferred objects will become apparent from the following description.

In one aspect the present invention resides in an internal combustion engine of the type including:

an engine block having a crankcase and at least one cylinder;

a crankshaft rotatably mounted in the crankcase;

a piston in the cylinder operatively connected to the crankshaft; and a cylinder head having at least one sparking plug closing the cylinder; wherein the improvement resides in:

the upper portion of the cylinder having a reduced diameter;

the piston having an upper crown portion complementary to the upper portion of the cylinder and to the face of the cylinder head;

a primary combustion chamber formed in the upper crown portion of the piston; and a secondary combustion chamber formed in the piston below the upper crown portion; so arranged that:

at or near top dead centre of the power stroke, the sparking plug ignites the air/fuel mixture in the primary combustion chamber and, as the piston descends in the cylinder, the burning air/fuel mixture ignites the air/fuel mixture in the secondary combustion chamber.

Preferably the reduced diameter portion in the upper cylinder is formed by a porting ring fitted in the upper end of a plain cylinder formed in the engine block. The porting ring may be fixed in the cylinder by keys or fasteners or may be a shrink fit. Preferably the ring has a plain cylindrical bore.

Preferably the upper crown portion is circular in plan and is provided with a small running clearance relative to the porting ring.

Preferably the primary combustion chamber is of substantially "dogbone" shape in plan, having a narrow deep central portion leading to enlarged shallow end portions.

Preferably the floor of the chamber is substantially semi-circular in side view.

Preferably the secondary combustion chamber is formed within the crown of the piston, the chamber being preferably annular in plan view. Preferably a peripheral port interconnects the secondary combustion chamber to the exterior of the piston below the upper crown portion.

Preferably the cylinder head has a pentroof face, with the intake and exhaust valves inclined or canted relative to the axis of the cylinder. Preferably valve reliefs are provided in the upper face of the piston crown to provide clearance between the piston and the valves.

BRIEF DESCRIPTION OF THE DRAWINGS

To enable the invention to be fully understood, a preferred embodiment will now be described with reference to the accompanying drawings, in which:

FIG. 1 is a perspective view, from above, of the piston;

FIG. 2 is a sectional side view of the engine with the piston just past top dead centre (TDC) on the intake stroke;

FIG. 3 is a view similar to FIG. 2 with the piston intermediate the compression stroke;

FIG. 4 is a view similar to FIG. 2 with the piston at TDC on the power stroke;

FIG. 5 is a view similar to FIG. 2 with the piston intermediate the power stroke; and FIG. 6 is a view similar to FIG. 2 with the piston at bottom dead centre (BDC) on the exhaust stroke.

The engine has an engine block 10 with a crankcase (not shown) which rotatably supports a crankshaft, a crankpin 11 of which is shown. The engine block 10 has a row of cylinders 12, one of which is shown; enclosed in a water jacket 13 connected to a radiator (not shown) to cool the engine.

A cylinder head 14 is bolted to the upper face of the engine block 10 and is provided with a respective combustion chamber configuration for each cylinder 12. An intake port 15 and exhaust port 16, connected to respective manifolds (not shown) are provided for each cylinder. Respective intake and exhaust valves 17,18 are provided to control the gas flow through the intake and exhaust ports 15,16 the operation of the valves being controlled by suitable cam gear (not shown). A sparking plug 19 is provided centrally in the cylinder head to ignite the air/fuel mixture.

A piston 20 is slidably mounted in the cylinder 12 and has a lower skirt portion 21 sealed to the cylinder by suitable compression rings 22 and an oil control ring 23.

A gudgeon (or wrist pin) 24 is fixed in the piston and is rotatably journalled in the "little end" 25 of a connecting rod 26 which has its "big end" 27 journalled on the crankpin 11.

Referring to FIG. 1, the crown 28 of the piston is of reduced diameter relative to the skirt portion 21 and has a small working clearance with the porting ring 29 fixed in the upper end of the cylinder 12. As shown, the crown 28 is substantially circular in plan and has a substantially frusto-conical upper face 30.

A pair of planar valve reliefs 31 are provided in the upper face to provide a clearance for the heads of the valves 15,16 (see FIG. 4).

A primary combustion chamber 32 extends across the upper face 30 of the crown 28 and is of "dogbone" shape in plan, the chamber having a narrow, but deep, central portion 33 interconnecting two larger, shallower end portions 34, the bottom wall of the chamber being substantially semi-circular in side view.

An annular secondary combustion chamber 35 is provided within the crown 28 and is provided with a peripheral port 36 adjacent the junction of the crown 28 and skirt portion 21. As shown in FIGS.2-6, the inner wall 37 of the secondary combustion chamber 35 is designed with a smooth curve to stimulate a swirling action in the air/fuel mixture as it enters the chamber to improve the distribution of the fuel in the mixture.

The operation of the engine will now be described.

Referring to FIG. 2, the intake valve 17 opens as the piston 20 passes TDC and commences its downward movement in the intake stroke. At this point only the primary combustion chamber 32 is exposed to the intake port 15. As the piston moves down, the volume above the piston rapidly increases, and the incoming air/fuel mixture is rapidly accelerated to ensure a high gas flow into the cylinder. When the crown portion 28 descends below the porting ring, the air/fuel mixture begins to flow into the secondary combustion chamber 35.

On the compression stroke, (FIG. 3), the air/fuel mixture is compressed in both the primary and secondary combustion chambers 32,35. However, when the crown 28 enters the porting ring, the two chambers are isolated.

Just before TDC, the ignition system (now shown) fires the sparking plug 19 to ignite the now compressed air/fuel mixture in the primary combustion chamber 32.

At TDC of the power stroke (FIG.4), the flame of the ignited air/fuel mixture is propogated through the primary combustion chamber but is unable to pass to the secondary combustion chamber 35. The piston 20 moves down the cylinder under pressure from the burning air/fuel mixture.

At approximately 40° ATDC (FIG. 5), the crown 28 of the piston 20 clears porting ring 29. The flame passes through between the ring and the piston and ignites the air/fuel mixture in the secondary combustion chamber. The pressure generated by this combustion drives the piston towards the end of the power stroke.

At BDC (FIG. 6), the exhaust valve 18 opens and the upward movement of the piston exhausts the now burnt gases via the exhaust port 16 until at TDC, the exhaust valve 18 is closed and intake valve 17 is opened to commence the induction stroke of the next cycle.

As will be readily apparent to the skilled addressee the operation of the engine is substantially identical to the standard "OTTO" cycle except that no valve overlap is used and the combustion of the air/fuel mixture in the power stroke is spread over a longer period through separate firings in the primary and secondary combustion chambers, the firing in the former initiating the firing in the latter.

While engines having two combustion chambers have been tried e.g. the "Honda CVCC" engine, to obtain this slower, double firing power stroke, these have required a separate pre-combustion chamber in the cylinder head provided with a separate intake port and valve and a richer mixture in the pre-combustion chamber. In the present invention, the intake and exhaust valves and ports are common to both chambers and the firing of the second combustion chamber is controlled by the position of the piston in the cylinder as ignition of the mixture in that chamber cannot commence until the piston crown has cleared the porting ring 29.

In new motors, the porting ring 29 may be machined integrally with the cylinder or, as with existing motors, it can be fitted to a plain cylinder. In either application, the conventional pistons are replaced by the pistons 20 of the present invention.

Testing has been carried out on a "Yamaha" (Trade Mark ) SR500 single cylinder motorcycle engine modified in accordance with the present invention.

The engine proved to run smoothly with no exhaust smell, revved cleanly, and had a healthy sounding exhaust note. Without varying the air/fuel mixture from standard sellings, the engine ran extremely rich indicating that a leaner air/fuel mixture can be used, improving the fuel economy of the engine. This richness of the mixture was particularly noticeable when the cam tuning was adjusted to ensure no valve overlap, indicating that the piston creates greater suction with the exhaust valve closed and that raw fuel is not lost through the exhaust.

To limit the expansion of the piston crown 28, the crown may be coated with, or formed of a ceramic material and this would enable a closer tolerance to be provided between the piston and the porting ring.

It is believed that the engine has the following advantages over conventional engines:

(1) cleaner burning;
(2) easier starting;
(3) the ability to idle at very low speeds due to the slower burning of the air/fuel mixture;
(4) the ability to run on unleaded fuels due to the large squish area of the piston;
(5) better fuel efficiency as all the fuel entering the cylinder is burnt;
(6) the elimination of all, or most, conventional anti-pollution devices; and
(7) an extended torque curve.

In addition the invention can be readily applied to existing engines.

It will be readily apparent to the skilled addressee that various changes and modifications may be made to the embodiment described without departing from the present invention.

I claim:

1. An internal combustion engine of the type including:
   an engine block having at least one cylinder, said cylinder having an upper portion and an upper crown portion;
   a piston in the cylinder operatively connected to a crankshaft; and
   a cylinder head, having at least one sparking plug, closing the cylinder, and a face;
   wherein the improvement resides in:
   the upper portion of the cylinder having a reduced diameter; the piston having an upper crown portion complementary to the upper portion of the cylinder and a face on said upper crown portion of said piston being complementary to the face of the cylinder head;

a primary combustion chamber formed above the upper crown portion of the piston; and a secondary combustion chamber formed within the piston below the face of the piston and within the upper crown portion of the piston being substantially enclosed therein;

the secondary combustion chamber being annular in plan with a peripheral port under the upper crown portion of the piston interconnecting said chamber to the cylinder;

so arranged that:

during operation said piston cycles through an intake stroke, a compression stroke, a power stroke and an exhaust stroke; and during the power stroke, an air/fuel mixture is compressed in both the primary and secondary combustion chambers; and at and near top dead centre of the power stroke, said primary and secondary chambers are isolated from each other, and the sparking plug ignites the air/fuel mixture in the primary chamber and, as the piston descends in the cylinder said burning air/fuel mixture ignites the air/fuel mixture in the secondary chamber.

2. An engine as claimed in claim 1 wherein:

two pressure pulses are applied to the piston on each power stroke as the air/fuel mixtures in the primary and secondary combustion chambers are ignited.

3. An engine as claimed in claim 1 wherein:

the reduced diameter upper portion of the cylinder is formed by a porting ring fitted in the cylinder adjacent the cylinder head and having a plain cylindrical bore; and the upper crown portion of the piston is substantially cylindrical with a small running clearance relative to the porting ring.

4. An engine as claimed in claim 3 wherein:

the porting ring separates the primary combustion chamber from the secondary combustion chamber when the piston is at and near top dead centre.

5. An engine as claimed in claim 3, including the intake valve, an exhaust valve, and the incoming air/fuel mixture, wherein:

at the beginning of the intake stroke, the intake valve is opened, the exhaust valve is closed and the piston descends, the descent of the piston in the cylinder causing a rapid acceleration of the air/fuel mixture coming into the cylinder to fill the primary and secondary chambers of the cylinder.

6. An engine as claimed in claim 5 wherein:

at the end of the compression stoke, said air/fuel mixtures are compressed in the primary and secondary combustion chambers and said chambers are isolated from each other.

7. An engine as claimed in claim 6 wherein:

the sparking plug ignites the air/fuel mixture in the primary combustion chamber at and before top dead centre of the power stroke, the burning air/fuel mixture in the primary combustion chamber being propogated through the cylinder and igniting the air/fuel mixture in the secondary combustion chamber when the crown portion of the piston clears the porting ring.

* * * * *